(12) United States Patent
Tan et al.

(10) Patent No.: US 7,717,601 B2
(45) Date of Patent: May 18, 2010

(54) SYSTEMS AND METHODS FOR COMPENSATING BRIGHTNESS UNIFORMITY OF BACKLIT IMAGE DISPLAYS

(75) Inventors: Ben Jin Tan, Singapore (SG); Thomas Tze Fung Chung, Singapore (SG)

(73) Assignee: Dell Products LP, Round Rock, TX (US)

( * ) Notice: Subject to any disclaimer, the term of this patent is extended or adjusted under 35 U.S.C. 154(b) by 59 days.

(21) Appl. No.: 11/906,152

(22) Filed: Sep. 28, 2007

(65) Prior Publication Data

US 2009/0086473 A1 Apr. 2, 2009

(51) Int. Cl.
*F21V 7/04* (2006.01)
(52) U.S. Cl. .............. 362/613; 362/240; 362/276; 362/802
(58) Field of Classification Search ............ 362/229, 362/235, 240, 611–614, 276, 802; 349/61–64, 349/68–70
See application file for complete search history.

(56) References Cited

U.S. PATENT DOCUMENTS

| 6,496,236 | B1 * | 12/2002 | Cole et al. ............. 349/61 |
| 6,914,389 | B2 * | 7/2005 | Chang et al. .......... 315/169.3 |
| 6,943,770 | B2 * | 9/2005 | Garcia et al. ............ 345/102 |
| 7,072,096 | B2 | 7/2006 | Holman et al. |
| 7,097,337 | B2 | 8/2006 | Kim et al. |
| 2004/0008504 | A1 | 1/2004 | Wang et al. |
| 2004/0012551 | A1 | 1/2004 | Ishii |
| 2004/0061814 | A1 | 4/2004 | Kim et al. |
| 2004/0130884 | A1 | 7/2004 | Yoo et al. |
| 2005/0135115 | A1 | 6/2005 | Lamb et al. |
| 2005/0135117 | A1 | 6/2005 | Lamb et al. |
| 2005/0219836 | A1 | 10/2005 | Hung |
| 2006/0215386 | A1 | 9/2006 | Hatanaka et al. |
| 2006/0245209 | A1 | 11/2006 | Jeong et al. |
| 2007/0002554 | A1 | 1/2007 | Lim |
| 2007/0002580 | A1 | 1/2007 | Ahn et al. |
| 2007/0047254 | A1 | 3/2007 | Schardt et al. |
| 2007/0103934 | A1 * | 5/2007 | Keh et al. ................ 362/612 |

FOREIGN PATENT DOCUMENTS

| EP | 1669796 A1 | 6/2006 |
| EP | 1791109 A1 | 5/2007 |
| JP | 2007-155829 | 6/2007 |
| KR | 10-2007-0028738 | 3/2007 |
| KR | 10-2007-0036868 | 4/2007 |
| WO | WO01/47037 A1 | 6/2001 |
| WO | WO2007/026463 A1 | 3/2007 |
| WO | WO2007/100207 A1 | 9/2007 |

OTHER PUBLICATIONS

Search Report, SG200802185-9, Sep. 2, 2008, 4 pgs.

* cited by examiner

*Primary Examiner*—Jason Moon Han
(74) *Attorney, Agent, or Firm*—O'Keefe, Egan, Peterman & Enders LLP (57) ABSTRACT

Systems and methods for compensating brightness uniformity of transmissive backlit display devices using auxiliary lights to provide additional light to compensate light provided by the main backlights of a backlit image display device. Auxiliary lights may be, for example, embedded into the light pipe area of an image display and/or placed in any other suitable position relative to the main backlights that is suitable for compensating the main backlights. In one example implementation, brightness uniformity of a transmissive image display may be at least partially compensated based at least in part on measured luminance of one or more areas of the display.

28 Claims, 6 Drawing Sheets

SYSTEMS AND METHODS FOR COMPENSATING BRIGHTNESS UNIFORMITY OF BACKLIT IMAGE DISPLAYS

FIELD OF THE INVENTION

This invention relates generally to image display and, more particularly, to backlighting image displays.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Figure 1:
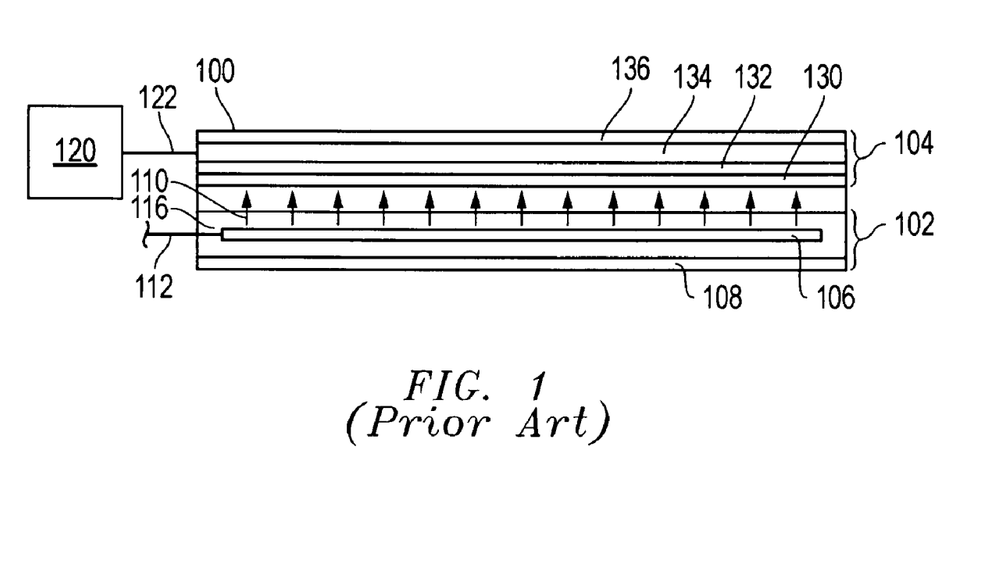
FIG. 1 is a simplified overhead cross-sectional view of a conventional LCD display device.
Figure 2:
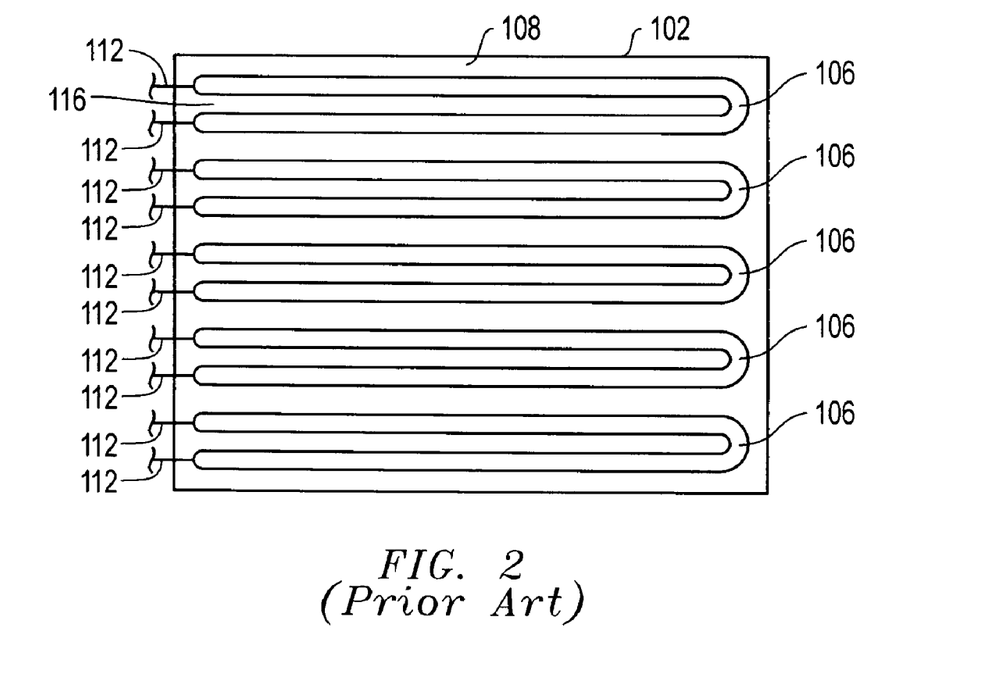
FIG. 2 is a simplified side cross-sectional view of a conventional LCD display device.

Display devices for information handling systems include liquid crystal display (LCD) display devices. Most LCD display devices employ cold cathode fluorescent lamp (CCFL) backlights for lighting the display. In one typical configuration illustrated in cross-section in FIG. 1, a LCD display device 100 is shown coupled to an information handling system 120 (such as a desktop personal computer) and includes a LCD backlight module 102 that is provided for lighting a transmissive LCD display panel 104. Such a transmissive display panel 104 typically includes multiple layers (e.g., diffuser layer 130, input polarizer layer 132, LCD crystal layer 134, output polarizer layer 136) that together operate to produce an image based on image data 122 provided by graphics/video processing components of information handling system 120. As shown in FIG. 2, LCD backlight module 102 includes multiple "U-shaped" CCFL backlights 106 that are disposed in spaced relationship to each other within a "light pipe" area 116 of the LCD backlight module 102. The multiple CCFL backlights 106 are distributed in top-to-bottom relationship and across the planar area of the LCD backlight module 102 as shown. As illustrated in FIGS. 1 and 2, LCD backlight module 102 is also provided with a reflector 108 that helps to direct light 110 produced by the CCFL backlights 106 toward the LCD display panel 104.

Uneven brightness and poor brightness uniformity are problems that are often experienced by conventional LCD display devices such as illustrated in FIGS. 1 and 2. These brightness problems may occur initially or over time due to a number of factors, such as due to the physical arrangement of the CCFL backlights 106 (e.g., uneven lamp spacing), stray capacitance that shunts partial lamp current between the two cathodes, light loss toward the ends of CCFL backlights 106 that are adjacent connectors for power 112, and aging of the CCFL backlights 106. It is typical for the brightness uniformity to deteriorate over time with use and wear of the CCFL backlight power connectors.

SUMMARY OF THE INVENTION

Disclosed herein are systems and methods for compensating brightness uniformity of transmissive backlit display devices. The disclosed systems and methods may be implemented using auxiliary lights (e.g., white light emitting diode and/or 3-color RGB light emitting diode lights) to provide additional light to compensate light provided by the main backlights (e.g., CCFL backlights) of a backlit image display device. Such auxiliary lights may be, for example, embedded into the light pipe area of an image display and/or placed in any other suitable position relative to the main backlights that is suitable for compensating the main backlights. For example, auxiliary backlights may be inserted on the side opposite the light pipe and/or between the main backlights depending on the particular shape and arrangement of the main backlight lamps. In one exemplary embodiment, white or 3-color light emitting diode (LED) lights having an adjustable color temperature (white point) may be employed as auxiliary backlights so that the color temperature produced for compensation may be adjusted to match the color temperature characteristics of the existing main backlights of the image display, e.g., for 72%, 92% or 102~4% high color gamut CCFL panels.

The disclosed systems and methods may be implemented in one exemplary embodiment to compensate brightness uniformity of a transmissive image display based at least in part on measured luminance of one or more areas of the display. In this regard, brightness uniformity of a display device may be adjusted based on display luminance measured at the factory (e.g., during assembly or calibration of an image display), and/or may be adjusted at any time later during the operating life of the image display based on luminance measurements that may be made using external light metering sensor/s and/or light metering sensor/s that are integral or provided internal to the display device itself. In one exemplary embodiment, a feed back loop may be provided that allows image display brightness uniformity to be adjusted in real time based on real time display brightness measurements received from one or more light metering sensor/s provided as integral components of the display device. In another embodiment, brightness uniformity of a display device may be adjusted based on user input, e.g., using an I/O device of an information handling system coupled to the display device. This capability advantageously allows a user to adjust display brightness uniformity to match the conditions under which the display is being viewed.

In one respect, disclosed herein is a method of compensating brightness uniformity of display for an information handling system, including: providing a transmissive display panel and one or more main backlight lamps configured to provide light to the transmissive display panel; providing one or more auxiliary backlight lamps configured to supplement light provided by the main backlight lamps to light the transmissive display panel; lighting an area of the transmissive display panel with the main backlight lamps; and providing light from the auxiliary backlight lamps to supplement light provided by the main backlight lamps to light the area of the transmissive display panel. In this exemplary method, the area of the transmissive display panel is lit with a first brightness uniformity by the main backlight lamps alone, and the area of the transmissive display panel is lit with a second brightness uniformity by the main backlight lamps and the auxiliary backlight lamps together, the second brightness uniformity being greater than the first brightness uniformity.

In another respect, disclosed herein is a display for an information handling system, including: a transmissive display panel and one or more main backlight lamps configured to provide light to an area of the transmissive display panel; and one or more auxiliary backlight lamps configured to supplement light provided by the main backlight lamps to light the transmissive display panel. In this exemplary method, the area of the transmissive display panel is lit with a first brightness uniformity by the main backlight lamps alone, and the area of the transmissive display panel is lit with a second brightness uniformity by the main backlight lamps and the auxiliary backlight lamps together, the second brightness uniformity being greater than the first brightness uniformity.

In another respect, disclosed herein is a method of compensating brightness uniformity of a display for an information handling system, including: providing a transmissive display panel, one or more backlights configured for lighting the transmissive display panel, and one or more auxiliary backlight lamps configured for selectably lighting the transmissive display panel; lighting the transmissive display panel with one or more main backlight lamps; and increasing the brightness uniformity of the transmissive display panel by selectably adjusting the brightness of the one or more auxiliary backlight lamps.

In another respect, disclosed herein is an information handling system and display, including: a transmissive display panel; one or more backlights configured for lighting the transmissive display panel; one or more auxiliary backlight lamps configured for selectably lighting the transmissive display panel; and one or more auxiliary backlight control components configured to increase a brightness uniformity of the transmissive display panel by selectably adjusting the brightness of the one or more auxiliary backlight lamps.

DESCRIPTION OF ILLUSTRATIVE EMBODIMENTS

Figure 3:
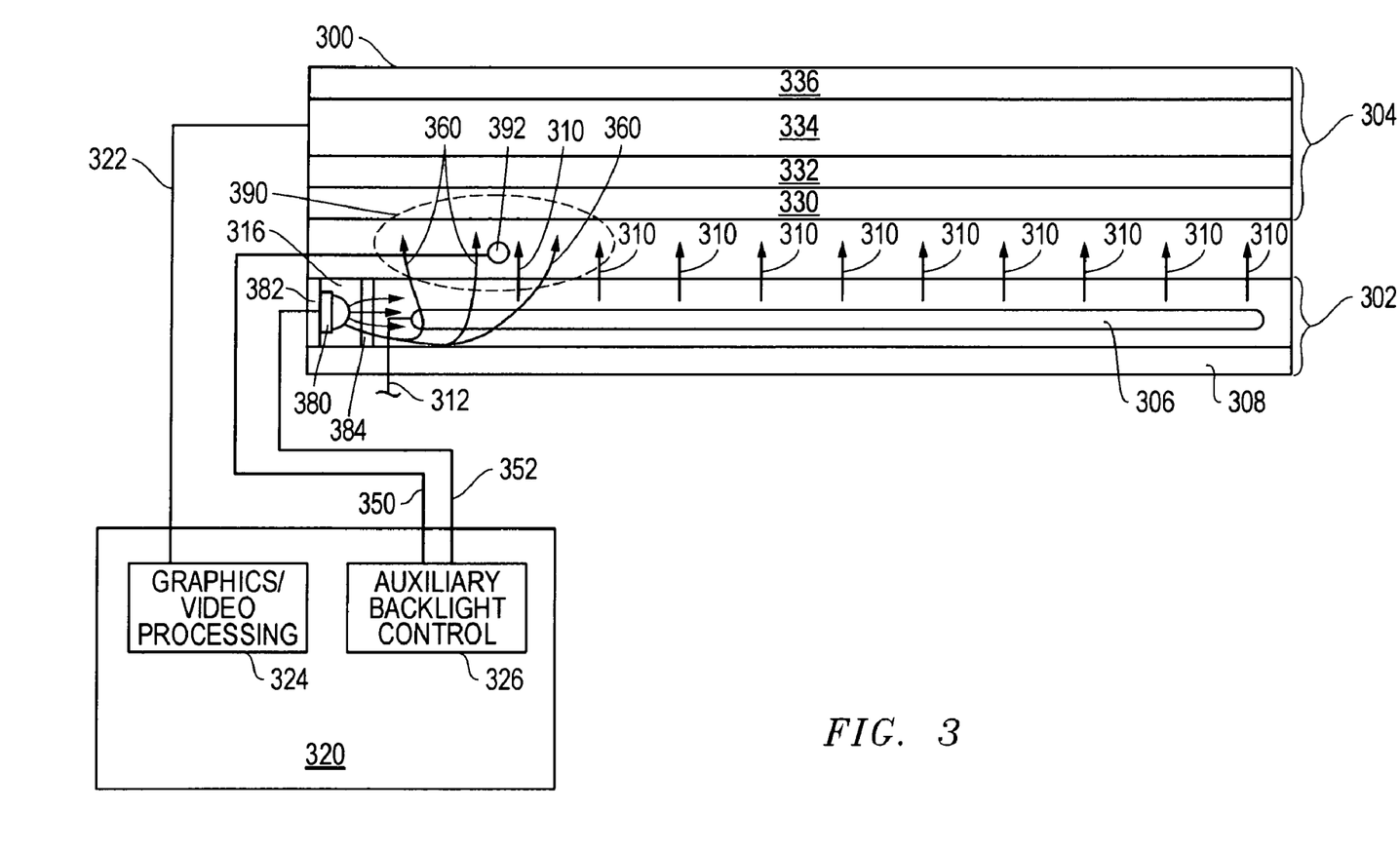
FIG. 3 is a simplified overhead cross-sectional view of a LCD display device configured according to one exemplary embodiment of the disclosed systems and methods.

FIG. 3 illustrates an overhead cross-sectional view of an LCD display device 300 configured according to one exemplary embodiment of the disclosed systems and methods. LCD display device 300 may be employed as, for example, an image display monitor for a desktop portable information handling system (e.g., desktop PC), an image display monitor for a portable information handling system (e.g., notebook computer), a television display, an instrument display (e.g., processing plant instrument display, aircraft or other vehicle instrument display), etc. In this exemplary embodiment, LCD display device 300 is shown coupled to an information handling system 320 which may be, for example, a desktop personal computer or other components of a portable information handling system such as a notebook computer that is configured with graphics/video processing component/s 324 and auxiliary backlight control component/s 326. It will be understood that the embodiment of FIG. 3 is exemplary only, and that any other configuration of image display device having one or more auxiliary backlights and one or more external (non-integrated) or integrated auxiliary backlight control components may be employed that is suitable for controlling auxiliary backlight/s in a manner as described elsewhere herein.

Still referring to FIG. 3, LCD display device 300 includes a LCD backlight module 302 that is provided for lighting transmissive LCD display panel 304. In this exemplary embodiment, transmissive display panel 304 includes diffuser layer 330, input polarizer layer 332, LCD crystal layer 334 and output polarizer layer 336 that together operate to produce an image based on image data 322 provided by graphics/video processing components 324 of information handling system 320. However, it will be understood that a transmissive display device may be configured with any other configuration of transmissive display panel that is suitable for receiving light from one or more backlights and for modifying the received light to displaying an image.

Figure 4:
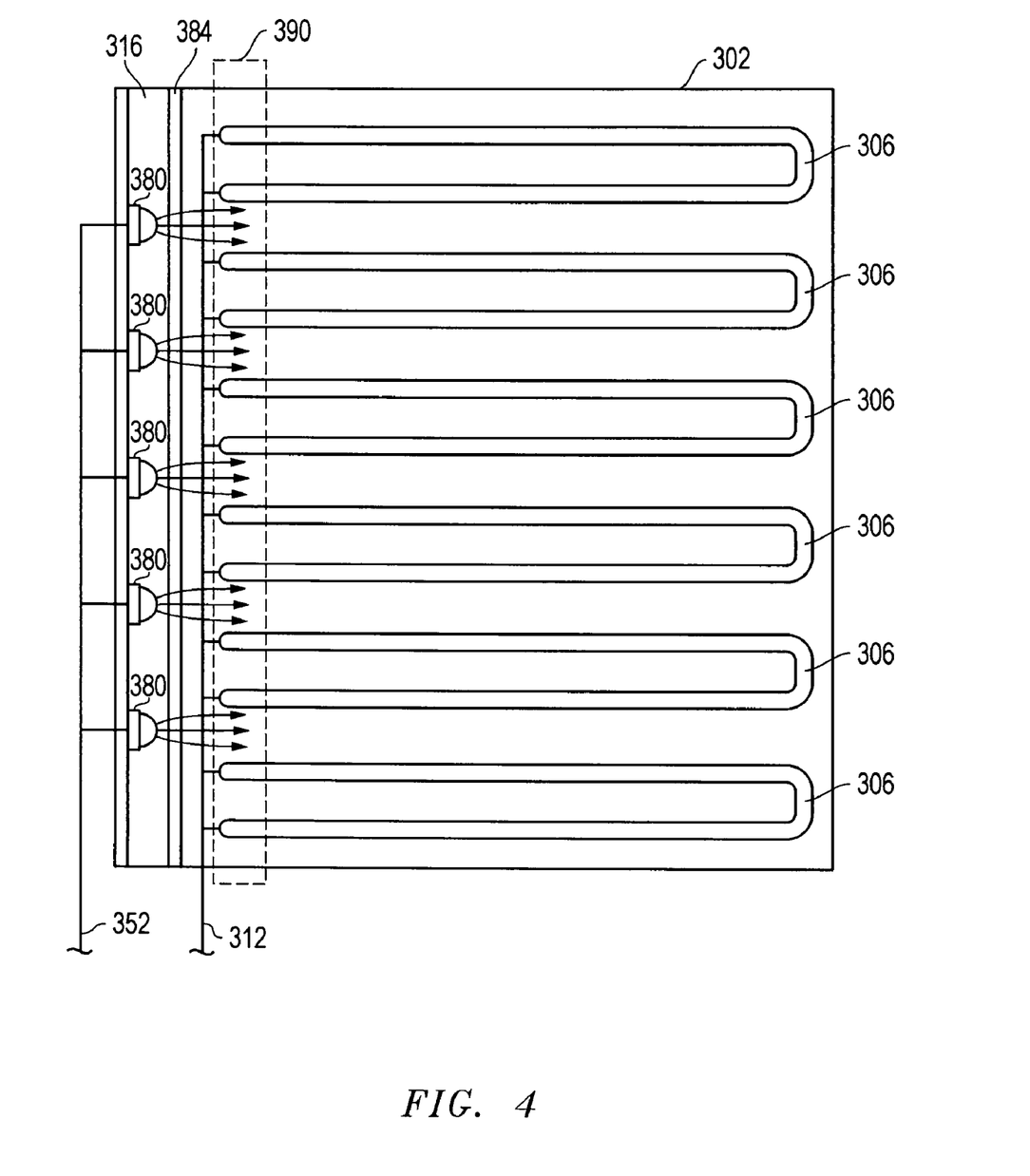
FIG. 4 is a simplified side cross-sectional view of a LCD display device configured according to one exemplary embodiment of the disclosed systems and methods.

FIG. 4 illustrates a front cross-sectional view of LCD backlight module 302 of FIG. 3. As shown in FIG. 4, backlight module 302 includes multiple "U-shaped" CCFL backlights 306 that are disposed in spaced relationship to each other within light pipe area 316 of LCD backlight module 302. In this embodiment, multiple CCFL backlights 306 are distributed in top-to-bottom relationship and across the planar area of LCD backlight module 302 as shown. In this configuration multiple CCFL backlights 306 are configured to provide light to light substantially the entire area of LCD display panel 304, although reduced areas of brightness may nevertheless exist within this area.

As illustrated in FIGS. 3 and 4, LCD backlight module 302 is also provided with a reflector 308 that helps to direct light 310 produced by CCFL backlights 306 toward LCD display panel 304. Although LCD backlight module 302 is provided in this exemplary embodiment with multiple U-shaped backlights 306, it will be understood that any other shape and/or configuration of one or more backlights suitable for backlighting a transmissive display panel may be employed in the practice of the disclosed systems and methods, e.g., multiple rod-shaped backlights extending at least partially across the width of a LCD backlight module in parallel relationship to each other with a connector on each end, etc. Furthermore, although LCD backlight module 302 is provided in this embodiment with CCFL backlights, other types of backlights may be employed within a backlight module including, but not limited to, hot cathode fluorescent lamp (HCFL), phosphorescent light source, external electrode light-emitting lamp (EEFL), electro luminance (EL), LED, etc.

Still referring to FIGS. 3 and 4, LCD backlight module 302 is provided in this embodiment with multiple auxiliary lights 380 that are supported by printed circuit board (PCB) 382 disposed along the external edge of light pipe area 316 so that auxiliary backlights 380 are embedded in the light pipe area 316. In this exemplary embodiment auxiliary lights 380 are mounted to extend from the same edge of light pipe area 316 as are CCFL backlights 306, and auxiliary lights 380 are mounted in substantially the same plane relative to LCD backlight module 302 as are CCFL backlights 306. As shown, auxiliary lights 380 are mounted to face inward to light pipe area 316 of LCD backlight module 302 so as to emit light 360 into light pipe 316 in a manner that is reflected by reflector 308 to supplement light emitted by CCFL backlights 306 to LCD display panel 304 from edge area 390 of LCD backlight module 302. In this exemplary embodiment, an optional diffuser layer 384 is provided between auxiliary backlights 380 and CCFL backlights 306 for purposes of diffusing the light from the CCFL lamps to achieve a uniformly illuminated surface.

With regard to the exemplary embodiment of FIGS. 3 and 4, brightness measurements have shown that brightness uniformity problems may be worse at the edges of some display devices, particularly at the backlight connector side of a display device where brightness may be less (e.g., about 10 to 15% less) than the center of the display device. Thus, auxiliary backlights 380 may be placed in one or more locations within a given display device that are selected to compensate for reduced brightness areas of the given display device, whether at the edge/s or elsewhere within the area of the display (e.g. toward the center or interior area of the display). Such reduced brightness areas may change over time as a given LCD display device ages and its CCFL backlights develop dim spots. Location/s of such an area of reduced brightness may be identified, for example, based on brightness testing of different points within a given display device (i.e., without auxiliary backlights 380), either with new CCFL backlights and/or over time as its CCFL backlights age. Therefore, it will be understood that the particular configuration of auxiliary backlights 380 relative to area 390 shown in FIGS. 3 and 4 is exemplary only.

In one exemplary embodiment, auxiliary backlights 380 may be white or 3-color light LED lights having an adjustable color temperature (white point) so that the color temperature produced for brightness compensation may be adjusted to match the color temperature characteristics of the existing main backlights of the image display, e.g., for 72%, 92% or 102~4% high color gamut CCFL panels.

It will be understood that the configuration (e.g., placement and number) of auxiliary backlights of FIGS. 3 and 4 for brightness compensation is exemplary only. In this regard, the layout and number of auxiliary backlights may be selected to meet the brightness compensation needs and/or characteristics of a particular display device application (e.g., including shape, type and arrangement of particular backlight lamps employed in the application and the brightness uniformity that is desired). For example, given the display device configuration of FIGS. 3 and 4, more auxiliary backlights 380 may be embedded at the opposite edge of the light pipe area 316 from the CCFL backlight connectors and/or may be placed in-between one or more pairs of adjacent CCFL backlights 306 (e.g., mounted in reflector 308 to provide more coverage and brightness compensation).

Figure 5:
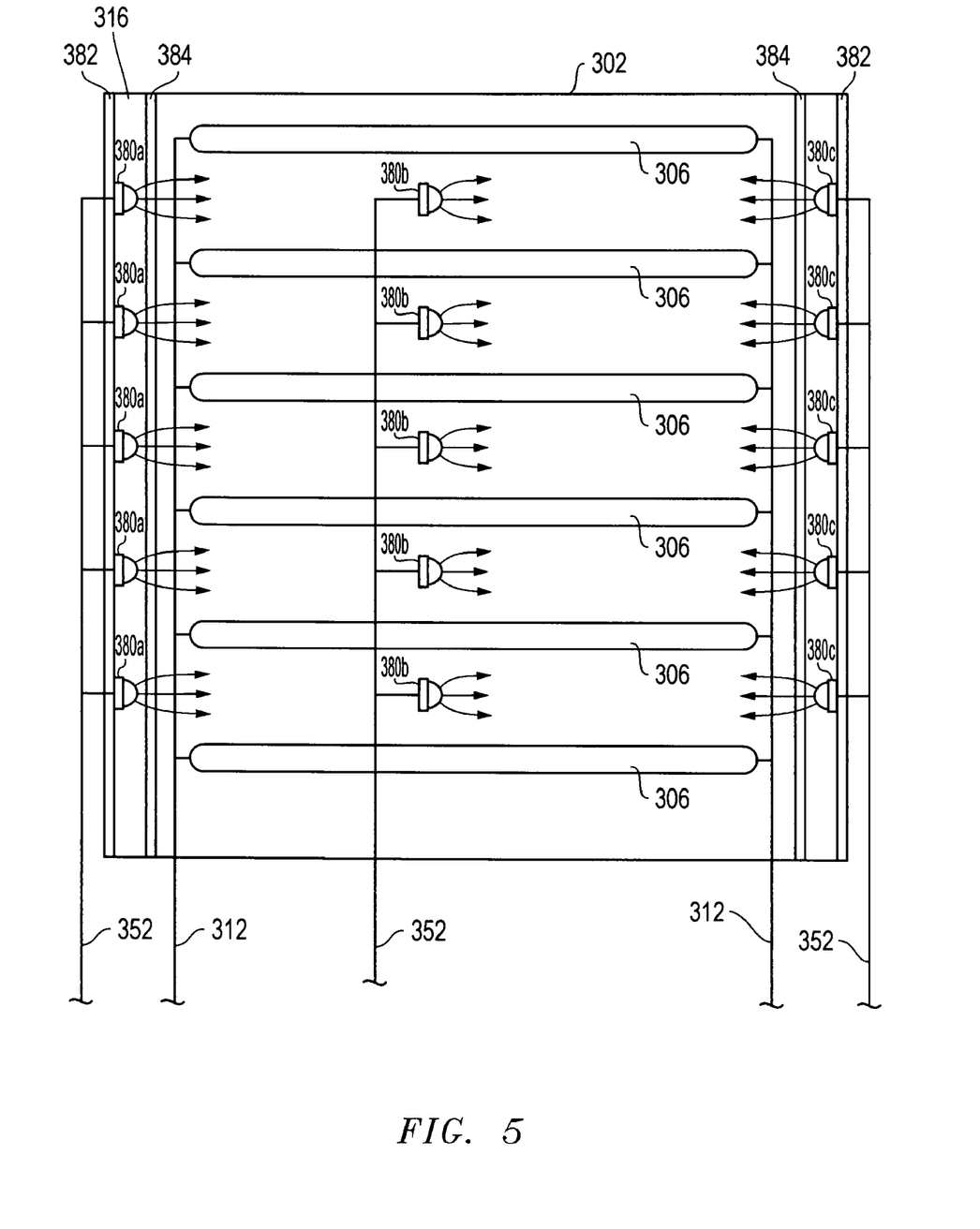
FIG. 5 is a simplified side cross-sectional view of a LCD display device configured according to one exemplary embodiment of the disclosed systems and methods.

FIG. 5 illustrates one possible configuration for a display device configuration that employs rod-shaped backlights extending across the width of the LCD backlight module 302 in parallel relationship to each other with a connector on each end, and having multiple auxiliary backlights 380a embedded at one edge of light pipe area 316 to emit light in-between each pair of CCFL backlights 306 (e.g., toward a first edge area 390 of LCD backlight module 302), multiple auxiliary backlights 380c embedded at the opposite edge of light pipe area 316 to emit light in-between each pair of CCFL backlights 306 (e.g., toward a second edge area 390 of LCD backlight module 302), and multiple auxiliary backlights 380b mounted in a position between the external edges of light pipe area 316 and in the interior area of LCD backlight module 302 so as to emit light in-between each pair of CCFL backlights 306 (e.g., toward the center of LCD backlight module 302) as shown. Thus, a display device may be configured with auxiliary backlights that emit light at one or more edge area locations of a transmissive display panel, and/or at one or more interior area locations (including adjacent a center area location) of a transmissive display panel. In this regard, auxiliary backlights 380 may be mounted at any one or more locations within an interior area of a LCD backlight module 302 of a display device 300.

Referring again to FIG. 3, LCD display device 300 may be provided in one exemplary embodiment with one or more integral light metering sensors 392 configured to monitor brightness at one or more points within display device 300. As shown, measured brightness data 350 may be provided from sensor/s 392 to auxiliary backlight control component/s 326 which may be configured to adjust brightness of one or more auxiliary lights 380 (e.g., by varying auxiliary backlight current 352 provided to auxiliary light/s 380 or by supplying a brightness control signal to another component that adjusts brightness of auxiliary backlight/s 380) based on measured brightness data 350. Auxiliary backlight control component/s 326 may include, for example, memory and one or more processors that are executing software and/or firmware suitable for performing the brightness uniformity adjustments and/or calibration procedures as described elsewhere herein.

Still referring to the embodiment of FIG. 3, such a brightness adjustment may be made, for example, by increasing brightness of an auxiliary backlight 380 in a given area of display device 300 in response to measurement of low brightness level (e.g., low brightness level relative to a target brightness level needed for desired uniformity) at the given location by a sensor 392. A similar methodology may be employed to decrease brightness of an auxiliary backlight 380 in a given area of display device 300 in response to measurement of high brightness level (e.g., high brightness level relative to a target brightness level needed for desired uniformity) at the given location by a sensor 392. In this regard, a brightness adjustment may be made automatically (e.g., via brightness uniformity algorithm executed by auxiliary backlight control component/s 326) and/or may be made manually (e.g., by a user of information handling system 320) via input/output devices such as keyboard, mouse, and/or via graphical user interface.

Figure 6:
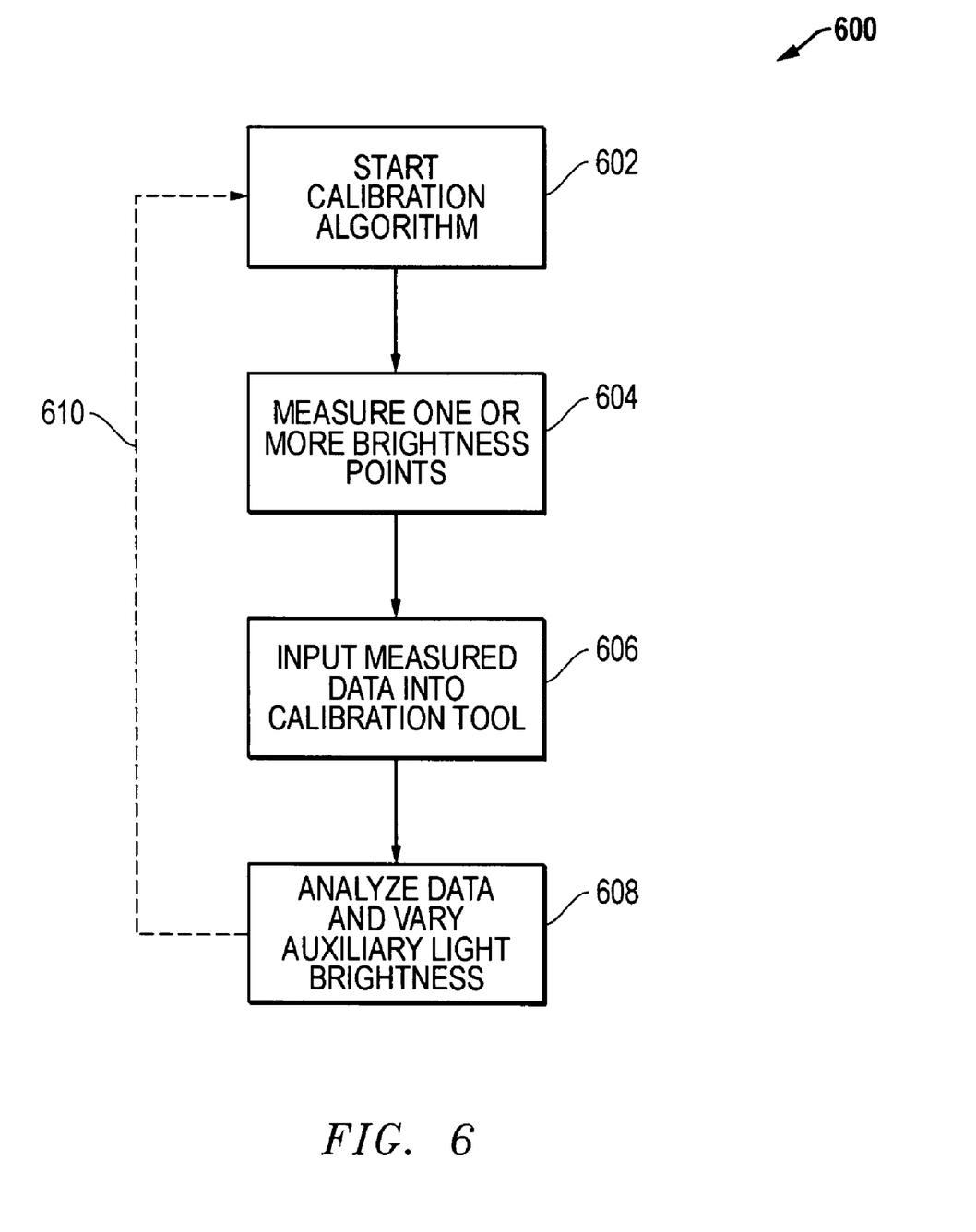
FIG. 6 illustrates a brightness calibration procedure according to one exemplary embodiment of the disclosed systems and methods.

FIG. 6 illustrates one exemplary embodiment of brightness calibration procedure 600 that may be employed to compensate brightness uniformity for a transmissive display device, e.g., such as LCD display devices 300 of FIGS. 3-5. In this regard, calibration procedure 600 may be performed at any time during the life or operation of a LCD display device 300, e.g., at the factory when assembled, by a customer after purchase, etc. Moreover calibration procedure 600 may be performed automatically by auxiliary backlight control component/s 326 of an information handling system 320 (e.g., coupled to receive measured brightness data 350 from one or more integral light metering sensor/s 392 and to control brightness uniformity by varying auxiliary backlight current 352 provided to one or more auxiliary light/s 380 or by supplying a brightness control signal), may be performed by firmware and/or software of a separate measurement instrument configured to receive measured display brightness data from one or more external light metering sensors and to output brightness control information to allow a user to manually vary auxiliary backlight brightness and/or to supply brightness control signal/s to a LCD display device to control auxiliary backlight brightness, may be performed manually by taking one or more manual measurements of display brightness and manually varying manually varying auxiliary backlight brightness based on the manual measurements, etc.

As shown in FIG. 6, exemplary calibration procedure 600 starts in step 602, e.g., in response to a command from a user, as part of an automated periodic calibration, in response to an automatic brightness uniformity measurement that deviates from a brightness uniformity set point, etc. Calibration procedure proceeds to step 604 where brightness of a LCD display device is measured at one or more points across the display area. In this regard, display brightness may be measured at any given point internal to a LCD display device 300 (e.g., within a LCD backlight module using an integral light metering sensor) or external to a LCD display device 300 (e.g., using external handheld or mounted light metering sensor applied to the front screen area of a LCD display device 300). Examples of equipment that may be employed to measure brightness in step 602 include, but are not limited to, color analyzers (e.g., using a Minolta CA210) employed under display-assembly factory conditions, or monitor calibration tools (e.g., ColorVision SpyderPro) employed by an end-user or customer in the home or office.

Figure 7:
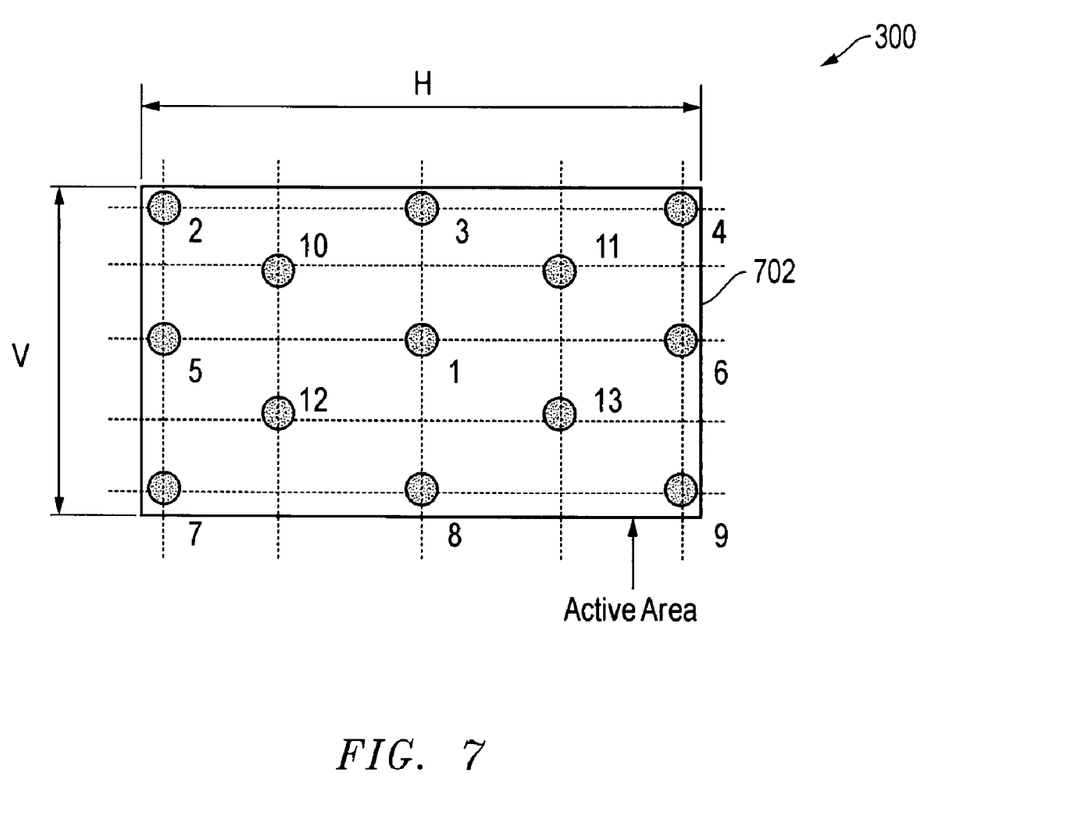
FIG. 7 illustrates active display area of a display device according to one exemplary embodiment of the disclosed systems and methods.

It will be understood that as few as one brightness point may be measured in step 604. However, in one exemplary embodiment multiple brightness points may be measured as illustrated in FIG. 7. In this regard, FIG. 7 shows an active display area 700 of a display device 300 having vertical dimension denoted by "V" and horizontal dimension denoted by "H". Multiple brightness points 1 through 13 are shown in FIG. 6, each of which represents a point where brightness of LCD display device 300 is measured, e.g., by integral or external light metering sensor). Examples of brightness point patterns include, but are not limited to, a 9-point brightness measurement procedure in which brightness measurements are taken at the first 1-9 brightness points illustrated in FIG. 7, or a 13-point brightness measurement procedure in which brightness measurements are taken at the first 1-13 brightness points illustrated in FIG. 7. Although multiple brightness points 1-13 are arranged in a matrix orientation in FIG. 7, it will be understood that any other suitable orientation of multiple display devices may be employed, including multiple points that are distributed uniformly or non-uniformly across the active display area of a display device.

After brightness is measured at one or more points in step 604, measured brightness data may be input into a brightness uniformity calibration software tool in step 606. Such a brightness uniformity calibration software tool may be executing, for example, on auxiliary backlight control component/s 326 of information handling system 320 of FIG. 3, or on any other suitable processor or combination of processors. Measured brightness data may then be analyzed in step 608 and the brightness of one or more auxiliary backlights 380 adjusted by the brightness uniformity calibration software tool based on the measured brightness data of step 604. Using the disclosed systems and methods, the brightness uniformity of an image display such as LCD display device 300 of FIG. 3 may be compensated using any methodology suitable for increasing the uniformity of at least a portion of the total area of an image display.

Where brightness of a image display is measured at multiple points such as illustrated in the exemplary embodiment of FIG. 7, brightness uniformity ($\delta_{WHITE\text{-}Full\ White\ Screen\ Pattern}$) of the image display may be defined as the minimum measured brightness value of all measured brightness points divided by the maximum measured brightness of all measure brightness points for a given measurement cycle as follows:

$$\delta_{WHITE} = \frac{\text{Minimum}(L_{on1}, L_{on2}, \ldots L_{onx})}{\text{Maximum}(L_{on1}, L_{on2}, \ldots L_{onx})} \times 100(\%) \qquad \text{Eq. (1)}$$

where: $L_{on}$ is measured luminance for each brightness measurement point 1 through x.

For example, given nine measured brightness points (e.g., measured in step 604 at points 1-9 of FIG. 7), brightness uniformity ($\delta_{WHITE}$) may be represented as follows:

$$\delta_{WHITE} = \frac{\text{Minimum}(L_{on1}, L_{on2}, \ldots L_{on9})}{\text{Maximum}(L_{on1}, L_{on2}, \ldots L_{on9})} \times 100(\%)$$

Still referring to FIG. 6, brightness uniformity ($\delta_{WHITE}$) of an image display may be compensated by ($\delta_{WHITE}$) varying brightness of one or more auxiliary backlights to maximize the brightness uniformity ($\delta_{WHITE}$) value calculated using Equation 1. This may be done, for example, by varying current provided by auxiliary backlight control components 326 to one or more auxiliary backlights 380 so as to maximize the value of $\delta_{WHITE}$ in Equation 1. It will be understood that the value of $\delta_{WHITE}$ may be maximized in this manner regardless of the overall brightness level of a image display such as LCD display device 300. In this regard, overall brightness level of a image display may be set in one embodiment prior to initiating step 602 of FIG. 6 by varying the main backlights (e.g., CCFL backlights 306) to meet a given user profile, user input (e.g., via brightness hotkeys), information handling system state (e.g., battery or AC power mode), and/or sensed ambient operating conditions (e.g., bright sunlight or office conditions versus nighttime or dim indoor lighting conditions). Brightness uniformity may then be maximized using the methodology of FIG. 6 for the given overall brightness level of the display.

As shown by optional flow path 610 in FIG. 6, calibration procedure 600 of FIG. 6 may optionally repeat in an iterative manner, e.g., when performed by auxiliary backlight control components 326 of FIG. 3. In this way, brightness uniformity may be continually adjusted over time (e.g., to compensate for deteriorated brightness uniformity value over time and/or to adjust brightness uniformity value with changing overall display brightness level). Alternatively, steps of calibration procedure 600 of FIG. 6 may be performed once without repeating (e.g., in response to user command).

It will be understood that the steps of calibration procedure 600 of FIG. 6 are exemplary only, and that any other combination of additional, alternative, or fewer steps may be employed that are suitable for compensating brightness uniformity of an image display in a manner as described elsewhere herein. It will also be understood that measured brightness data may be analyzed manually and/or adjustments to auxiliary backlights be made manually (e.g., by a user or technician), and that the disclosed calibration procedure may be applied to compensate brightness uniformity of types of transmissive display devices other than an LCD display device.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method of compensating brightness uniformity of display for an information handling system, comprising:
   providing a transmissive display panel and one or more main backlight lamps configured to provide light to said transmissive display panel;
   providing one or more auxiliary backlight lamps configured to supplement light provided by said main backlight lamps to light said transmissive display panel;
   lighting an area of said transmissive display panel with said main backlight lamps; and
   providing light from said auxiliary backlight lamps to supplement light provided by said main backlight lamps to light said area of said transmissive display panel;
   wherein said area of said transmissive display panel is lit with a first brightness uniformity by said main backlight lamps alone, said first brightness uniformity being defined as a minimum measured brightness value of multiple brightness points measured across a given area of the transmissive display panel when the transmissive display panel is lit by said main backlight lamps alone divided by a maximum measured brightness value of multiple measured brightness points measured across the given area of the transmissive display panel when the transmissive display panel is lit by said main backlight lamps alone; and
   wherein said area of said transmissive display panel is lit with a second brightness uniformity by said main backlight lamps and said auxiliary backlight lamps together, said second brightness uniformity being defined as a minimum measured brightness value of multiple brightness points measured across the given area of the transmissive display panel when the transmissive display panel is lit by said main backlight lamps and said auxiliary backlight lamps together divided by a maximum measured brightness value of multiple measured brightness points measured across the given area of the transmissive display panel when the transmissive display panel is lit by said main backlight lamps and said auxiliary backlight lamps together; and
   wherein said second brightness uniformity is greater than said first brightness uniformity.

2. The method of claim 1, wherein said transmissive display panel comprises a liquid crystal display (LCD) panel; wherein said main backlight lamps comprise cold cathode fluorescent lamps (CCFLs); and wherein said auxiliary backlight lamps comprises light emitting diodes (LEDs).

3. The method of claim 1, wherein said auxiliary backlight lamps comprise at least one auxiliary backlight positioned to emit light at one or more edge area locations of said transmissive display panel; or wherein said auxiliary backlight lamps comprise at least one auxiliary backlight positioned to emit light at one or more interior area locations of said transmissive display panel; or a combination thereof.

4. The method of claim 1, further comprising providing a light pipe area configured to provide light to said transmissive display panel; wherein said main backlight lamps extend from at least one external edge of said light pipe area; and wherein said auxiliary backlight lamps also extend from said same at least one external edge of said light pipe area in a position adjacent said main backlight lamps.

5. The method of claim 4, wherein said main backlight lamps comprise at least two main backlight lamps extending from said at least one external edges of said light pipe area; and wherein said auxiliary backlight lamps comprise at least one auxiliary backlight also extending from said same at least one external edge of said light pipe area adjacent and in-between said at least two main backlight lamps.

6. The method of claim 4, wherein said main backlight lamps comprise at least two main backlight lamps extending from said at least one external edges of said light pipe area toward an interior area of said light pipe area; and wherein said auxiliary backlight lamps comprise at least one auxiliary backlight disposed at a location adjacent an interior area of said transmissive display panel and in-between said at least two main backlight lamps.

7. The method of claim 1, further comprising providing multiple light metering sensors configured to monitor brightness at said multiple brightness points of said transmissive display panel; measuring brightness data corresponding to said first brightness uniformity at said multiple brightness points of said transmissive display panel; and adjusting brightness of said one or more auxiliary backlight lamps based at least in part on said measured brightness data and one or more auxiliary backlight control components to light said transmissive display panel with said second brightness uniformity, and without regard to the overall brightness level of the transmissive display panel.

8. The method of claim said method comprising:
   lighting said transmissive display panel with said one or more main backlight lamps;
   then measuring a brightness of said lighted transmissive display panel at multiple brightness points across the display area of said transmissive display panel;
   then determining said first brightness uniformity value based on said measured brightness of said transmissive display panel; and
   then increasing the brightness uniformity of said transmissive display panel by selectably adjusting the brightness of said one or more auxiliary backlight lamps based at least in part on said determined first brightness uniformity value.

9. The method of claim 8,
   wherein said method comprises measuring brightness of said transmissive display panel at multiple points across the display area of said transmissive display panel; determining said first brightness uniformity value of said transmissive display panel by determining the minimum measured brightness value of all measured brightness points divided by the maximum measured brightness of all measured brightness points; and adjusting the brightness of said one or more auxiliary backlight lamps to achieve said second brightness uniformity value for said transmissive display panel that is greater than said first brightness uniformity value.

10. The method of claim 8, further comprising providing multiple light metering sensors as integral components of a display device that comprises said transmissive display panel; and iteratively performing in real time said steps of measuring brightness of said transmissive display panel at said multiple brightness points using said integral light metering sensors, determining a first brightness uniformity value, and increasing the brightness uniformity of said transmissive display panel.

11. The method of claim 8, further comprising providing multiple external light metering sensors as external components of a display device that comprises said transmissive display panel; and measuring brightness of said transmissive display panel at said multiple brightness points using said external light metering sensors.

12. The method of claim 8, further comprising outputting said determined first brightness uniformity value to a user; and increasing the brightness uniformity of said transmissive display panel by adjusting the brightness of said one or more auxiliary backlight lamps based on input received from said user.

13. The method of claim 1, wherein said auxiliary backlight lamps comprise at least one auxiliary backlight positioned to emit light at one or more interior area locations of said transmissive display panel.

14. The method of claim 1, wherein each of said main backlight lamps extend across a width of said display panel in parallel relationship to each other, and wherein said multiple auxiliary backlights are mounted in a position in an interior area of said display panel so as to emit light in-between each pair of backlight lamps.

15. An information handling system, comprising:
a transmissive display panel and one or more main backlight lamps configured to provide light to an area of said transmissive display panel; and
one or more auxiliary backlight lamps configured to supplement light provided by said main backlight lamps to light said transmissive display panel;
wherein said area of said transmissive display panel is lit with a first brightness uniformity by said main backlight lamps alone, said first brightness uniformity being defined as a minimum measured brightness value of multiple brightness points measured across a given area of the transmissive display panel when the transmissive display panel is lit by said main backlight lamps alone divided by a maximum measured brightness value of multiple measured brightness points measured across the given area of the transmissive display panel when the transmissive display panel is lit by said main backlight lamps alone; and
wherein said area of said transmissive display panel is lit with a second brightness uniformity by said main backlight lamps and said auxiliary backlight lamps together, said second brightness uniformity being defined as a minimum measured brightness value of multiple brightness points measured across the given area of the transmissive display panel when the transmissive display panel is lit by said main backlight lamps and said auxiliary backlight lamps together divided by a maximum measured brightness value of multiple measured brightness points measured across the given area of the transmissive display panel when the transmissive display panel is lit by said main backlight lamps and said auxiliary backlight lamps together; and
wherein said second brightness uniformity is greater than said first brightness uniformity.

16. The information handling system of claim 15, wherein said transmissive display panel comprises a liquid crystal display (LCD) panel; wherein said main backlight lamps comprise cold cathode fluorescent lamps (CCFLs); and wherein said auxiliary backlight lamps comprises light emitting diodes (LEDs).

17. The information handling system of claim 15, wherein said auxiliary backlight lamps comprise at least one auxiliary backlight positioned to emit light at one or more edge area locations of said transmissive display panel; wherein said auxiliary backlight lamps comprise at least one auxiliary backlight positioned to emit light at one or more interior area locations of said transmissive display panel; or a combination thereof.

18. The information handling system of claim 15, further comprising a light pipe area configured to provide light to said transmissive display panel; wherein said main backlight lamps extend from at least one external edge of said light pipe area; and wherein said auxiliary backlight lights also extend from said same at least one external edge of said light pipe area in a position adjacent said main backlight lamps.

19. The information handling system of claim 18, wherein said main backlight lamps comprise at least two main backlight lamps extending from said at least one external edges of said light pipe area; and wherein said auxiliary backlight lamps comprise at least one auxiliary backlight also extending from said same at least one external edge of said light pipe area adjacent and in-between said at least two main backlight lamps.

20. The information handling system of claim 18, wherein said main backlight lamps comprise at least two main backlight lamps extending from said at least one external edges of said light pipe area toward an interior area of said light pipe area; and wherein said auxiliary backlight lamps comprise at least one auxiliary backlight disposed at a location adjacent an interior area of said transmissive display panel and in-between said at least two main backlight lamps.

21. The information handling system of claim 15, further comprising multiple light metering sensors configured to monitor brightness at said multiple brightness points of said transmissive display panel corresponding to said first brightness uniformity at said multiple brightness points of said transmissive display panel; and one or more auxiliary backlight control components configured to adjust brightness of said one or more auxiliary lights based at least in part on said measured brightness data from said one or more light metering sensors to light said transmissive display panel with said second brightness uniformity, and without regard to the overall brightness level of the transmissive display panel.

22. The system of claim 15, further comprising:
one or more auxiliary backlight control components configured to increase a brightness uniformity of said transmissive display panel by selectably adjusting the brightness of said one or more auxiliary backlight lamps.

23. The system of claim 22, further comprising:
multiple light metering sensors coupled to said one or more auxiliary backlight control components, said multiple light metering sensors being integral components of a display device that comprises said transmissive display panel, and being configured to measure a brightness of said transmissive display panel at multiple brightness points;

wherein said one or more auxiliary backlight control components are configured to increase a brightness uniformity of said transmissive display panel by selectably adjusting the brightness of said one or more auxiliary backlight lamps based on brightness of said transmissive display panel measured at said multiple brightness points by said one or more light metering sensors.

24. The system of claim 23, wherein said one or more auxiliary backlight control components are configured to iteratively and in real time increase a brightness uniformity of said transmissive display panel by selectably adjusting the brightness of said one or more auxiliary backlight lamps based on brightness of said transmissive display panel measured at said one or more points by said multiple light metering sensors.

25. The information handling system of claim 15, wherein said auxiliary backlight lamps comprise at least one auxiliary backlight positioned to emit light at one or more interior area locations of said transmissive display panel.

26. The information handling system of claim 15, wherein each of said main backlight lamps extend across a width of said display panel in parallel relationship to each other, and wherein said multiple auxiliary backlights are mounted in a position in an interior area of said display panel so as to emit light in-between each pair of backlight lamps.

27. A method of compensating brightness uniformity of a display for an information handling system, comprising:

providing a transmissive display panel, one or more backlights configured for lighting said transmissive display panel, and one or more auxiliary backlight lamps configured for selectably lighting said transmissive display panel;

lighting said transmissive display panel with one or more main backlight lamps; and increasing the brightness uniformity of said transmissive display panel by selectably adjusting the brightness of said one or more auxiliary backlight lamps;

wherein the brightness uniformity of said transmissive display panel is defined as a minimum measured brightness value of multiple brightness points measured across a given area of the transmissive display panel when the transmissive display panel is lit divided by a maximum measured brightness value of multiple measured brightness points measured across the given area of the transmissive display panel when the transmissive display panel is lit; and where the method further comprises:

lighting said transmissive display panel with said one or more main backlight lamps, then measuring a brightness of said lighted transmissive display panel at multiple brightness points across the display area of said transmissive display panel to identify the location of one or more areas of reduced brightness when the transmissive display panel is lit by the one or more main backlight lamps alone, then positioning the one or more auxiliary backlights in locations to compensate for the one or more identified areas of reduced brightness, then determining a first brightness uniformity value based on said measured brightness of said transmissive display panel by determining the minimum measured brightness value of all measured brightness points divided by the maximum measured brightness of all measured brightness points, and then increasing the brightness uniformity of said transmissive display panel by selectably adjusting the brightness of said one or more auxiliary backlight lamps based at least in part on said determined first brightness uniformity value.

28. A method of compensating brightness uniformity of a display for an information handling system, comprising:

providing a transmissive display panel, one or more backlights configured for lighting said transmissive display panel, and one or more auxiliary backlight lamps configured for selectably lighting said transmissive display panel;

lighting said transmissive display panel with one or more main backlight lamps; and increasing the brightness uniformity of said transmissive display panel by selectably adjusting the brightness of said one or more auxiliary backlight lamps;

wherein the brightness uniformity of said transmissive display panel is defined as a minimum measured brightness value of multiple brightness points measured across a given area of the transmissive display panel when the transmissive display panel is lit divided by a maximum measured brightness value of multiple measured brightness points measured across the given area of the transmissive display panel when the transmissive display panel is lit; and where the method further comprises:

lighting said transmissive display panel with said one or more main backlight lamps until said transmissive display panel develops one or more areas of reduced brightness over time when the transmissive display panel is lit by the one or more main backlight lamps alone due to aging of the main backlight lamps, then measuring a brightness of said lighted transmissive display panel at multiple brightness points across the display area of said transmissive display panel to identify the location of the developed one or more areas of reduced brightness when the transmissive display panel is lit by the one or more main backlight lamps alone, then positioning the one or more auxiliary backlights in locations to compensate for the one or more identified developed one or more areas of reduced brightness, then determining a first brightness uniformity value based on said measured brightness of said transmissive display panel by determining the minimum measured brightness value of all measured brightness points divided by the maximum measured brightness of all measured brightness points, and then increasing the brightness uniformity of said transmissive display panel by selectably adjusting the brightness of said one or more auxiliary backlight lamps based at least in part on said determined first brightness uniformity value.

* * * * *